(12) United States Patent
Boshev et al.

(10) Patent No.: US 10,067,808 B2
(45) Date of Patent: Sep. 4, 2018

(54) NONDETERMINISTIC OPERATION EXECUTION ENVIRONMENT UTILIZING RESOURCE REGISTRY

(71) Applicant: SAP SE, Walldorf (DE)

(72) Inventors: Stoyan Boshev, Sofia (BG); Chavdar Baikov, Sofia (BG); Tsvetan Stoyanov, Sofia (BG); Petio Petev, Sofia (BG)

(73) Assignee: SAP SE, Walldorf (DE)

( * ) Notice: Subject to any disclaimer, the term of this patent is extended or adjusted under 35 U.S.C. 154(b) by 66 days.

(21) Appl. No.: 14/942,613

(22) Filed: Nov. 16, 2015

(65) Prior Publication Data

US 2017/0139758 A1 May 18, 2017

(51) Int. Cl.
*G06F 13/00* (2006.01)
*G06F 9/54* (2006.01)
*G06F 17/30* (2006.01)

(52) U.S. Cl.
CPC ........ *G06F 9/544* (2013.01); *G06F 17/30312* (2013.01)

(58) Field of Classification Search
CPC ............................ G06F 9/544; G06F 17/30312
USPC .......................................................... 719/328
See application file for complete search history.

(56) References Cited

U.S. PATENT DOCUMENTS

| | | | | |
|---|---|---|---|---|
| 9,665,416 B1 * | 5/2017 | Boshev | .................... | G06F 9/546 |
| 2010/0235469 A1 * | 9/2010 | Morris | .............. | G06F 17/30887 |
| | | | | 709/219 |
| 2012/0069385 A1 * | 3/2012 | Von Hatten | ........... | G06F 3/1203 |
| | | | | 358/1.15 |
| 2012/0159003 A1 * | 6/2012 | Craig | .................... | G06F 3/0611 |
| | | | | 710/7 |
| 2013/0311612 A1 * | 11/2013 | Dickinson | ............. | G06F 17/301 |
| | | | | 709/219 |
| 2015/0121155 A1 * | 4/2015 | Boshev | .................... | H04L 67/10 |
| | | | | 714/48 |
| 2015/0178025 A1 * | 6/2015 | Nasu | ..................... | G06F 3/1236 |
| | | | | 358/1.15 |

* cited by examiner

*Primary Examiner* — S. Sough
*Assistant Examiner* — Kimberly L Jordan
(74) *Attorney, Agent, or Firm* — Fountainhead Law Group P.C.

(57) ABSTRACT

A resource registry provides nondeterministic operation environment affording flexible access for resource execution and status monitoring on the cloud. The resource registry service provides generic resource management utilizing registration, updating, and unregistration by resource providers. A requester for an operation may register in the resource registry, an operation resource having parameters defined in metadata. The resource registry notifies a registered resource listener of this registration of the operation resource. The resource listener may then execute the operation according to parameters defined in the operation resource. The resource listener returns a response to the resource registry, concerning a result of execution of the operation. The resource registry updates this status in the metadata of the operation resource. The requester is then able to look up the operation resource's metadata to determine current status of the operation. The nondeterministic operation environment desirably avoids direct coupling between operation requestor and operation executor APIs.

9 Claims, 7 Drawing Sheets

NONDETERMINISTIC OPERATION EXECUTION ENVIRONMENT UTILIZING RESOURCE REGISTRY

BACKGROUND

Unless otherwise indicated herein, the approaches described in this section are not prior art to the claims in this application and are not admitted to be prior art by inclusion in this section.

Embodiments relate to resource access by a plurality of applications, and in particular to a resource registry having a feedback feature allowing implementation of a nondeterministic operation execution environment.

In certain contexts, a single resource may be sought to be shared between a plurality of different applications. For example, Customer Resource Management (CRM) and Enterprise Resource Management (ERM) applications may seek to perform operations on data (e.g., customer contacts, customer accounts, customer addresses, etc.) that are held in common within a same in-memory database.

Typically, while the resource (operation executor) is responsible for performing the operation itself, that operation executor and an operation requestor (e.g., an application) must exchange some information. For example, a resource may comprise an in-memory database whose engine is responsible for executing an operation (e.g., data aggregation, etc.).

In order to continue to function, the requester of the operation (e.g., a CRM application) may need to know the status of the operation (e.g., whether an aggregation is in-progress, has been successfully completed, or is unable to be successfully completed).

Another example of the exchange of information between an operation requestor and an operation executor, includes providing roles and/or permissions to be imported in a target system. Still other examples involving exchange of information between operation requestors and executors, include providing and importing Meta-data Framework (MDF) objects to a target system, and the discovery and registration of specific objects.

Conventionally, such activities are performed with direct calls between the operation requestor and the operation executor. However, issues can arise within such (deterministic) resource environments requiring direct communication between requestor and executor.

For example, the requester needs to know the exact Uniform Resource Locator (URL) of the executor (e.g., the location of the in-memory database on the cloud). That URL, however, may change/evolve over time—e.g., as the in-memory database expands and is migrated into a larger capacity space.

Also, the executors and the requesters of operations can comprise a large number of different types of applications. Ensuring the ability for direct communication between such a variety of entities can render the configuration setup complex and error-prone.

Finally, different executors may provide different Application Program Interfaces (APIs) for the execution of an operation. This specificity in API limits flexibility in the allocation of resources between a plurality of operation requestors and operation executors, for example as may arise in a cloud computing environment.

SUMMARY

Embodiments provide a nondeterministic operation execution environment affording flexible access for resource execution and monitoring on the cloud. A resource registry service provides generic resource management utilizing registration, updating, and unregistration by resource providers. The resource registry allows looking up available resources and/or listening for changes in those resources. The resource registry includes a feedback feature providing an indication of the status of execution of an operation.

A requester for an operation may register in the resource registry, an operation resource having parameters defined in metadata. The resource registry notifies a registered resource listener of this registration of the operation resource. The resource listener may then execute the operation according to parameters defined in the operation resource. The resource listener returns a response to the resource registry, concerning a result of execution of the operation. The resource registry updates this status in the metadata of the operation resource. The requester is then able to look up the operation resource's metadata in order to determine a current status of the operation.

An embodiment of a computer-implemented method comprises registering in a resource registry, an operation resource comprising data and metadata. An Application Program Interface (API) of the resource registry receives from an operation requestor, an operation including a parameter. In response to the operation, the resource registry references the data and the metadata to cause the API to forward the operation to an operation executor. The API receives from the operation executor, a current status of the operation. The resource registry updates the metadata to reflect the current status, and the resource registry feeds back the current status to the operation requestor based upon the operation resource.

A non-transitory computer readable storage medium embodies a computer program for performing a method comprising providing a resource registry comprising an Application Program Interface (API) and an operation resource comprising data and metadata. The API receives from an operation requestor, an operation including a parameter. In response to the operation, the resource registry references the data and the metadata to cause the API to forward the operation to an operation executor. The API receives from the operation executor, a current status of the operation. The resource registry includes the current status in the metadata. In response to polling by the operation requestor, the resource registry feeds back the current status to the operation requestor based upon the operation resource.

An embodiment of a computer system comprises one or more processors and a software program executable on said computer system to cause a resource registry to receive from an operation requestor, an operation including a parameter. In response to the operation, reference data and metadata of an operation resource of the resource registry cause an API of the resource registry to forward the operation to an operation executor. The API receives from the operation executor, a current status of the operation. The current status is included in the metadata, and in response to polling by the operation requestor, the current status is fed back to the operation requestor based upon the operation resource.

In certain embodiments the current status of the operation is fed back in response to polling the resource registry by the operation requestor.

In some embodiments the current status includes a JavaScript Object Notation (JSON) body.

According to various embodiments, the metadata further identifies a binary file associated with the operation.

In particular embodiments the metadata identifies a location of a repository containing the binary file.

In some embodiments the resource registry further comprises a resource accessor component in communication with the repository.

In certain embodiments the repository comprises an in-memory database.

According to particular embodiments, the resource registry comprises an in-memory database engine.

In various embodiments the data and the metadata are stored in an in-memory database.

The following detailed description and accompanying drawings provide a better understanding of the nature and advantages of embodiments.

DETAILED DESCRIPTION

Described herein are methods and apparatuses providing a nondeterministic operation execution environment utilizing a resource registry having a feedback feature. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Figure 1:
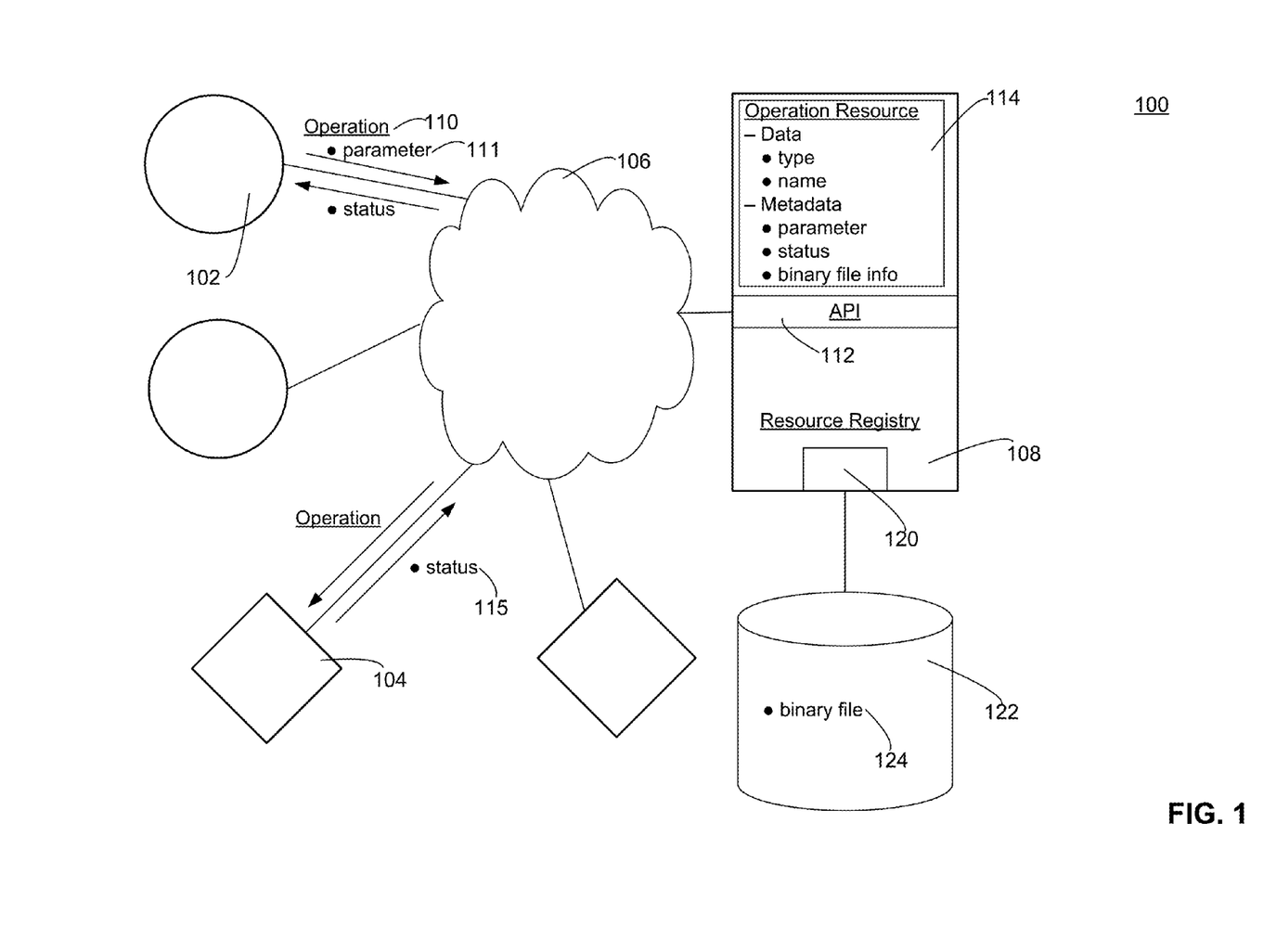
FIG. 1 shows a simplified block diagram of a system according to an embodiment.

FIG. 1 is a simplified view of a system 100 according to an embodiment. In particular, a plurality of operation requestors 102 are in communication with a plurality of operation executors 104, via a network 106 and a resource registry 108.

An operation requestor is configured to provide an operation 110 comprising a parameter 111, to the network. The resource registry receives that operation via an API 112.

The resource registry includes one or more registered operation resources 114. An operation resource comprises both data and associated metadata. Operation resource data can include a type of the operation resource, and a name of the operation resource.

Operation resource metadata can include parameters of the operation and information (e.g., location, ID) of a binary file for execution in conjunction with the operation. Operation resource metadata can also include a current status of execution of the operation (e.g., in progress, successfully completed, unsuccessful, etc.) Additional details regarding the operation resource, including its constituent data and metadata, are provided in the Examples described later below.

Based upon the data and metadata of the operation resource, the resource registry routes the operation to the appropriate executor. The operation executor seeks to execute the operation according to the parameters.

The executor then feeds back to the resource registry, an indication of the status 115 of execution of the operation. The operation resource metadata is in turn updated in order to reflect the current status of the operation.

Based upon the data and the metadata of the operation resource, the operation requestor polls the resource registry to obtain operation execution status. This allows the operation requestor to continue operating while the operation is in-process.

In FIG. 1 it is noted that the operation requestor and the operation executor are not in direct contact with one another. Rather, they communicate via the intervening API of the resource registry. Thus, the APIs of the operation requestor and the operation executor need not be directly coupled, but instead need only be compatible with the resource registry API.

FIG. 1 further shows a resource registry as including a resource accessor component 120. That resource accessor component is in communication with a repository 122 storing binary file 124.

Specifically, in some cases the operation will function in combination with a target binary file. That binary file may be stored remotely from the operation requestor. Thus, the resource accessor provides access to an operation's binary data that is located in a remote repository.

It is noted that the binary file itself may be the subject of a separate operation resource. That operation resource corresponding to the binary file, is also registered in the resource registry and defined by respective data and corresponding metadata. This is shown and described below in connection with FIG. 4.

Figure 2:
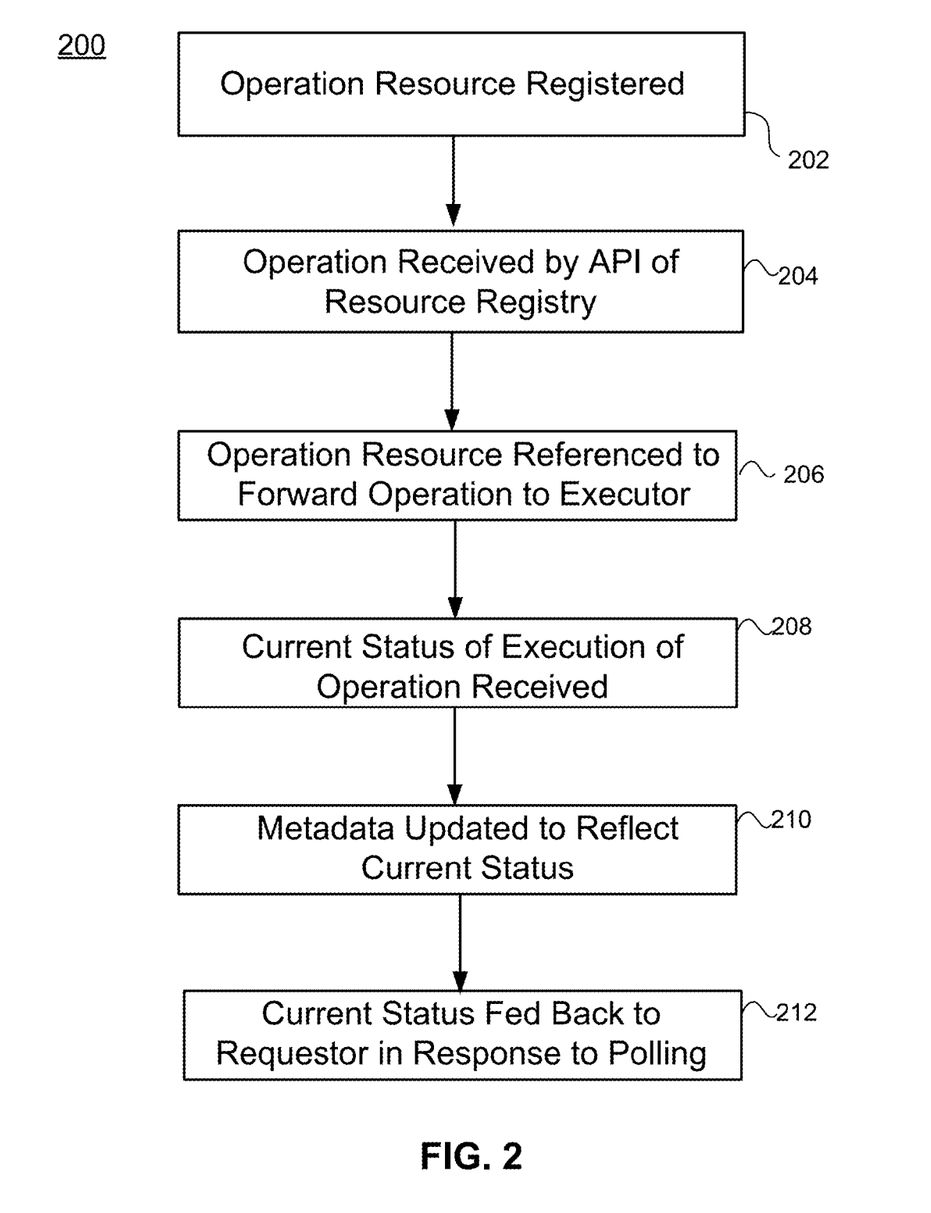
FIG. 2 shows a simplified flow diagram of a method according to an embodiment.

FIG. 2 shows a simplified flow diagram of a method 200 according to an embodiment. In a first step 202, an operation resource comprising data and metadata is registered in resource registry.

In a second step 204, the resource registry API receives from an operation requestor, an operation including parameters. In a third step 206, the engine references the data and the metadata to cause the API to forward the operation to an operation executor.

In a fourth step 208, the API receives from the operation executor, a current status of the operation. In a fifth step 210, the resource registry updates the metadata to reflect the current status.

In a sixth step 212, in response to polling by the operation requestor, the resource registry returns the current status of execution of the operation to the requestor.

Embodiments may offer one or more benefits in the context of accessing available resources. For example, running operations in a nondeterministic environment as described above, allows the requester and the executor of the operation to not be bound by specific APIs. That is, the operation requestor and operation executor need not communicate directly. Rather, this communication occurs through the common API of an intermediary resource registry having the capability to retain and feed back status information.

Further details regarding particular embodiments are now described in connection with the following examples. The first example illustrates implementation of a nondeterministic execution environment within the SAP HANA Cloud Platform (HCP) infrastructure available from SAP SE, of Walldorf, Germany. A second example illustrates execution of an operation comprising the discovery of widgets in an HTML5 application, within the HCP infrastructure.

EXAMPLE

Figure 3:
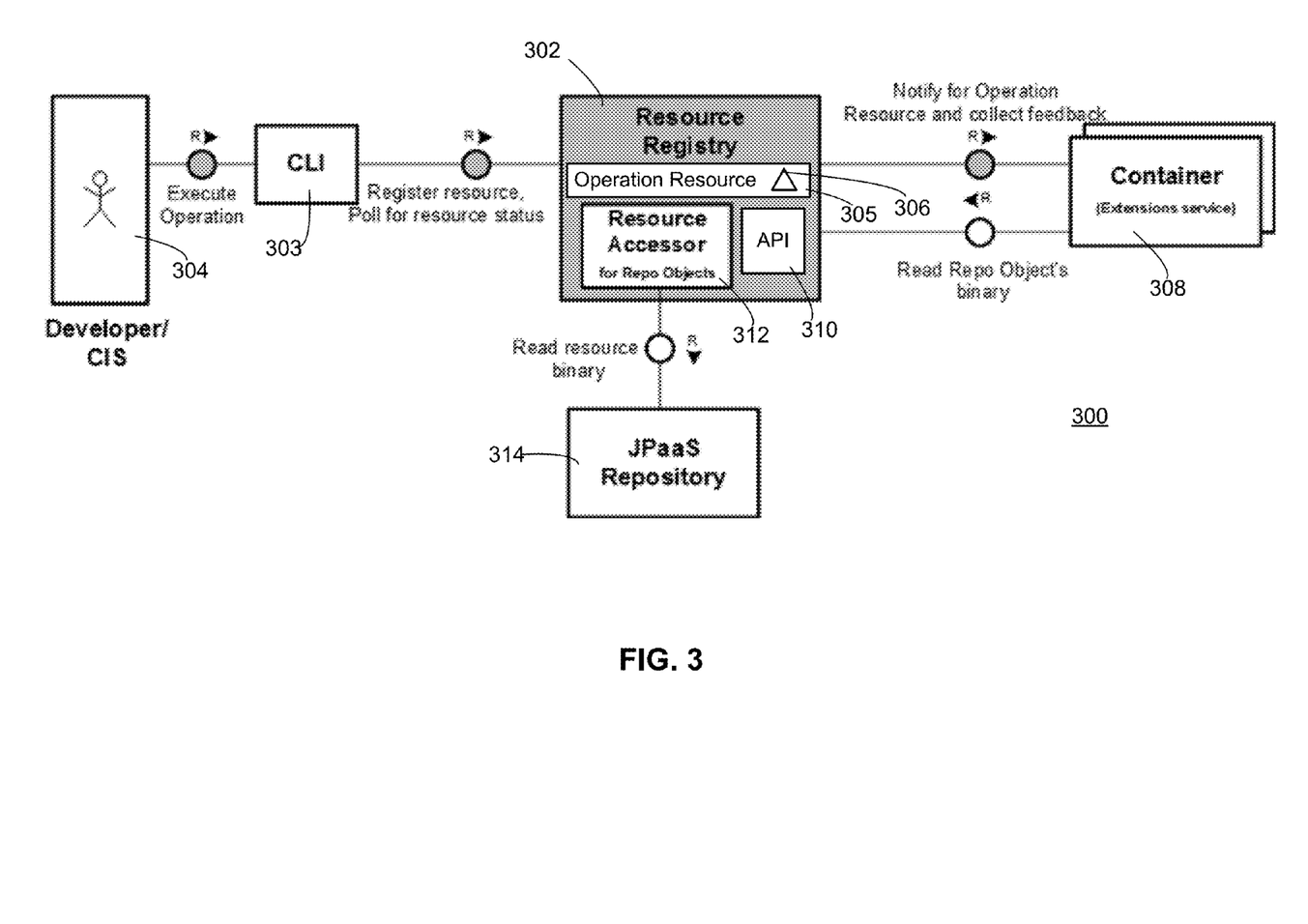
FIG. 3 is a simplified architecture diagram of a system according to an example.

FIG. 3 provides an overview of a system 300 according to this example. Specifically, FIG. 3 shows implementation of a resource registry 302 with the SAP Console Line Interface (CLI) 303 affording cloud-based access to the SAP HANA in-memory database.

There are scenarios where running operations in HCP is needed, and the requester and executor of the operation shall not be bound by specific APIs (i.e., they are to be decoupled). Such scenarios can include but are not limited to the following cloud-type applications:
providing roles and permissions to be imported;
providing and importing of portal sites in a cloud portal;
providing and importing MDF objects.

According to various embodiments, the API of a resource registry can be utilized to achieve this desired decoupling between operation requestor and operation executor. The resource registry includes a capability to provide feedback concerning resource status. That is, an operation requestor (resource provider) would like to know whether the created resource has been processed by an operation executor (resource listener), and the result of that processing (e.g., in progress, successful, or not successful).

In the specific example of FIG. 3, an operation resource 305 is created in the resource registry 302. In a development scenario, the creator 304 of the operation resource is the developer. In the production scenario the creator is a Commercial Infrastructure Service (CIS).

The operation resource includes data and metadata 306. As discussed in detail below, the data may include an identifier, a resource type, a resource name, and a last modified date.

As also discussed below, the metadata of the registered operation resource may include an account on which the operation is executed, and a name of the operation. Other metadata can include parameters, such as parameters of the operation that is to be executed. The metadata may further comprise metadata instructing the resource registry to receive feedback from the resource listener responsible for performing the operation in question.

Specifically, the operation is executed by a resource listener 308 comprising a container such as an Extensions service (or a cloud portal). The developer (or CIS) would like to know whether the operation was successfully executed by the target container. Thus, the system according to this example seeks to allow execution of an operation in a HCP, and provide feedback about execution of that operation.

Accordingly, the resource registry provides an API 310 that utilizes basic authentication. The resource registry may define operation resources including their data and corresponding metadata, and how to request and provide feedback for such operation resources.

Specifically, the resource registry recognizes those resources for which feedback is required, and receives feedback from resource listeners. The resource registry provides the feedback by the resource listeners, to the resource providers.

The architecture diagram of FIG. 3 further shows the resource registry as including a resource accessor 312. That resource accessor is in communication with repository 314. The roles of both the resource accessor and the repository are discussed later below in connection with this example.

Figure 3A:
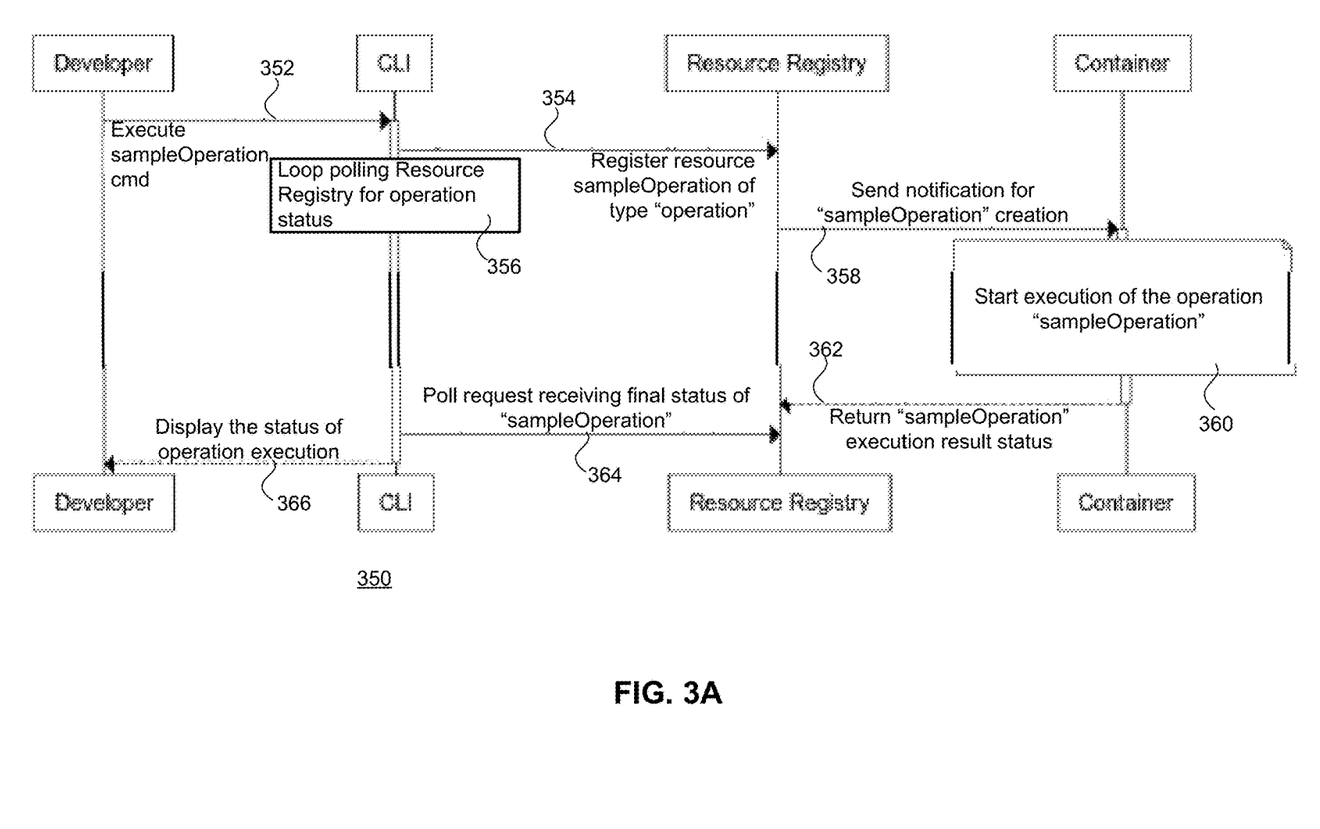
FIG. 3A is a simplified flow diagram showing a method according to the example.

FIG. 3A is a simplified flow diagram showing a method performed according to the architecture shown in FIG. 3. In particular, FIG. 3A shows the sequence of actions 350 which are performed in the case when developer executes a sample operation.

Specifically, in a first step 352 the developer executes sampleOperation command in the Console Line Interface. The sampleOperation command may include some defined parameters.

In a second step 354 implementation of the sampleOperation command registers in the resource registry, a new resource with name: "sampleOperation", and type "operation". Any existing parameters of the operation are added as part of the metadata properties of the operation resource.

As shown in step 356, implementing the command commences polling the resource registry to read the status of the resource until it becomes available or a timeout occurs.

In step 358, the resource registry sends to the container, notification for the newly created operation resource. The container had been initially registered with the resource registry as a remote resource listener.

In step 360, the container starts the execution of the operation "sampleOperation" according to the parameters defined in operation resource's metadata. During this execution of the operation resource, it may be possible for the container to call the resource registry to request one or more binaries which will be retrieved via the resource accessor. This is illustrated in greater detail below in connection with FIG. 4.

In step 362, when execution of the operation is complete, the container returns response for the notification request. The response contains the status of the operation execution: success or failure. The resource registry adds the received status as feedback in the resource "sampleOperation".

In step 364, implementation of the command "sampleOperation" receives the feedback information for the result of the execution of the operation with the next subsequent poll request to the Resource Registry.

In step 366, The implementation of the command "sampleOperation" displays the status of the operation execution to the developer.

Turning now to provide additional details regarding this specific example, a registered operation resource may have the following data:
id= automatically generated ID by the resource registry;
type="operation";
name= a string describing the resource; and
lastModified= last modified date in milliseconds (UTC).

The registered operation resource may also have the following metadata:
"account"—the account on which the operation is executed; and
"operationName"—the name of the operation.

The registered operation resource may also include certain optional metadata, depending upon the particular operation.

The "resourceTarget" metadata identifies the target resource for the operation. This is used to point on which repo.object resource the operation shall be executed. Some operations may not require repo.object resource, in which case this metadata will not be relevant.

The "containerTarget" metadata identifies the target container of the operation. This is used to explicitly select the target container that is to process the operation. This helps avoiding processing of an operation by multiple containers. Proper selection of the target container may be ensured by the containers (resource listeners) themselves, by registering for resource type "operation" and with filter for the "containerTarget" metadata property. There may be no separate business logic added to the resource registry which is specific to handling of "operation" resources.

The "resourceRepository" metadata identifies the repository where the repo.object is located. Examples can include but are not limited to JAVA Platform as a Service (JPaaS) Repository, git, and others etc. Other varieties of optional metadata may also possibly be used to create the nondeterministic operation environment.

The operation resource shall also include the resource registry specific metadata, to instruct the resource registry to receive feedback (e.g., status information) from the resource listener processing the operation in question. An example is given as follows.

```
{
 "metadata": {
   "operationName": "import_SFSF_roles",
   "resourceTarget": "sfroles.zip",
   "resourceRepository": "jpaas.repo",
   "containerTarget": "extensions.service",
   "account": "sap",
   "_requireFeedback_": "true"
 },
 "name": "Operation import_SFSF_roles on resource sfroles.zip in
 account sap", "type": "operation",
 "id": "aaaabbbbcccc",
 "lastModified": 1414077104039
}
```

As previously mentioned, the architecture diagram of FIG. 3 further includes a resource accessor as part of the resource registry. Specifically, in many cases the operations will work with a target binary represented by a resource of type "repo.object".

A role of the resource accessor, therefore, is to provide access to resource's binary data that is located in a remote repository. In this example, the resource accessor is capable of retrieving a resource's binaries from an appropriate repository (in FIG. 3, the JPaaS Repository). Such a resource accessor component has access to resources of type "repo.object" in various accounts.

Access to the resource registry may be protected by a whitelist, and only containers are allowed to have access. This whitelist affords access to resource registry based on the coordinates of the service, and is synchronized with a security officer. Other embodiments could provide additional enhancements to the authorization model.

Downloading of a binary file represented by a repo.object is now described. Specifically, in order to read a resource's binaries of a resource of type repo.object in this example, the following API of the resource registry service is called:

GET/resourceRegistry/api/v1/resaccessor/repo.object/<id of repo.object>

Response: Content-Type: application/octet-stream
Response Body: input stream to the resource's file The mechanism by which containers receive feedback, is now described. Each resource that shall receive feedback for its processing by the notified listeners shall contain the following metadata:

"_requireFeedback_": "true"

In order to include feedback by containers, the response of the resource listeners (containers) shall return a JAVASCRIPT OBJECT NOTATION (JSON) body for resources requiring/supporting feedback (i.e., operations).

In this example, the HTTP code shall be 200 in case of a successful processing of a resource. Other HTTP codes such as 4xx, 5xx are also accepted with a JSON body containing feedback.

Here, the JSON body shall have the following structure:

```
{
 "status" : "SUCCESS"|"ERROR",
 "<any attribute>":"<any value>"
}
```

The attributes in the JSON body will be added by the resource registry in the metadata of the resource operation. When adding the attributes in the resource operation's metadata, the resource registry will add the following prefix to every attribute:

"_feedback_."

The resource registry will add the feedback received by listeners into the metadata of the resource. In this specific example, the resource registry will add the following feedback metadata, if an attempt to notify a resource listener was triggered:

_feedback_.http.status.code=<status line code, e.g. 200, 403, 404, 500, etc.>
_feedback_.http.status.line.message=<status line message (Reason Phrase)>

Certain special cases related to the feedback mechanism, are now described. Under some circumstances, the resource listener does not return the JSON body with feedback.

Thus if a target resource listener returns HTTP code 204 having: • no body; • "cannot be contacted" (i.e. error 404) information; or • another type of error returned without a JSON body, the resource registry will add automatically feedback to the resource's metadata:

_feedback_.status=ERROR
_feedback_.rr.details="No response body"
_feedback_.http.code=<status line code, e.g. 204, 403, 404, 500, etc.>
_feedback_.http.status.line.message=<status line message>

Another special case arises where an Exception/Error occurs while notifying a resource listener. If such an Exception or Error occurs while notifying a resource listener, the resource registry will automatically add feedback to the resource's metadata:

_feedback_.status=ERROR
_feedback_.rr.details="Exception occurred while notifying resource listener"

Still another special case arises where a resource listener returns an invalid JSON body. Then, the resource registry will add automatically feedback to the resource's metadata:

_feedback_.status=ERROR
_feedback_.rr.details="Invalid JSON body in response"
_feedback_.http.code=<status line code, e.g. 200, 403, 404, 500, etc.>
_feedback_.http.status.line.message=<status line message>

Yet another special case may arise where no resource listener is available to be contacted. Specifically, if no resource listener is registered to handle a notification regarding a resource change requiring feedback, the resource registry will automatically add the following metadata as feedback:

__feedback__.status=NO_REGISTERED_LISTENERS
__feedback__.rr.details="No resource listener is available to process the resource's change"

In some cases, there may be multiple resource listeners. If the resource registry detects such a situation (i.e. multiple resource listeners are to be notified regarding a change of resource requiring feedback), the resource registry does not notify any of the resource listeners, and the resource registry adds the following feedback in the resource's metadata:

__feedback__.status=MULTIPLE_REGISTERED_LISTENERS
__feedback__.rr.details="There are multiple listeners registered to process the resource's change"

A variety of feedback status values are possible. One example of such feedback status values for a resource are:

__feedback__.status="SUCCESS"|"ERROR"|
"NO_REGISTERED_LISTENERS"|
"MULTIPLE _REGISTERED_LISTENERS"

A resource registry may include additional features. For example, when the resource registry applies feedback metadata to a resource, this may not be considered as update of the resource and may not lead to notifications to the resource listeners.

After the resource registry applies feedback metadata to a resource, the resource registry may persistently store the resource. Under certain circumstances, it may be appropriate to instruct the resource registry not to persistently store certain resources. For example, the operation resource itself is not needed to be stored permanently. Thus it is desirable to instruct the resource registry not to store persistently resources of the type "operation".

Here, this can be done by using a configuration file for the resource registry. That configuration file lists the resource(s) that are not to be persistently stored.

The resource registry may audit log the received feedback by listeners. The resource registry can log special cases related to feedback (e.g., no listeners are available, or more than one listener is available).

EXAMPLE

Figure 4:
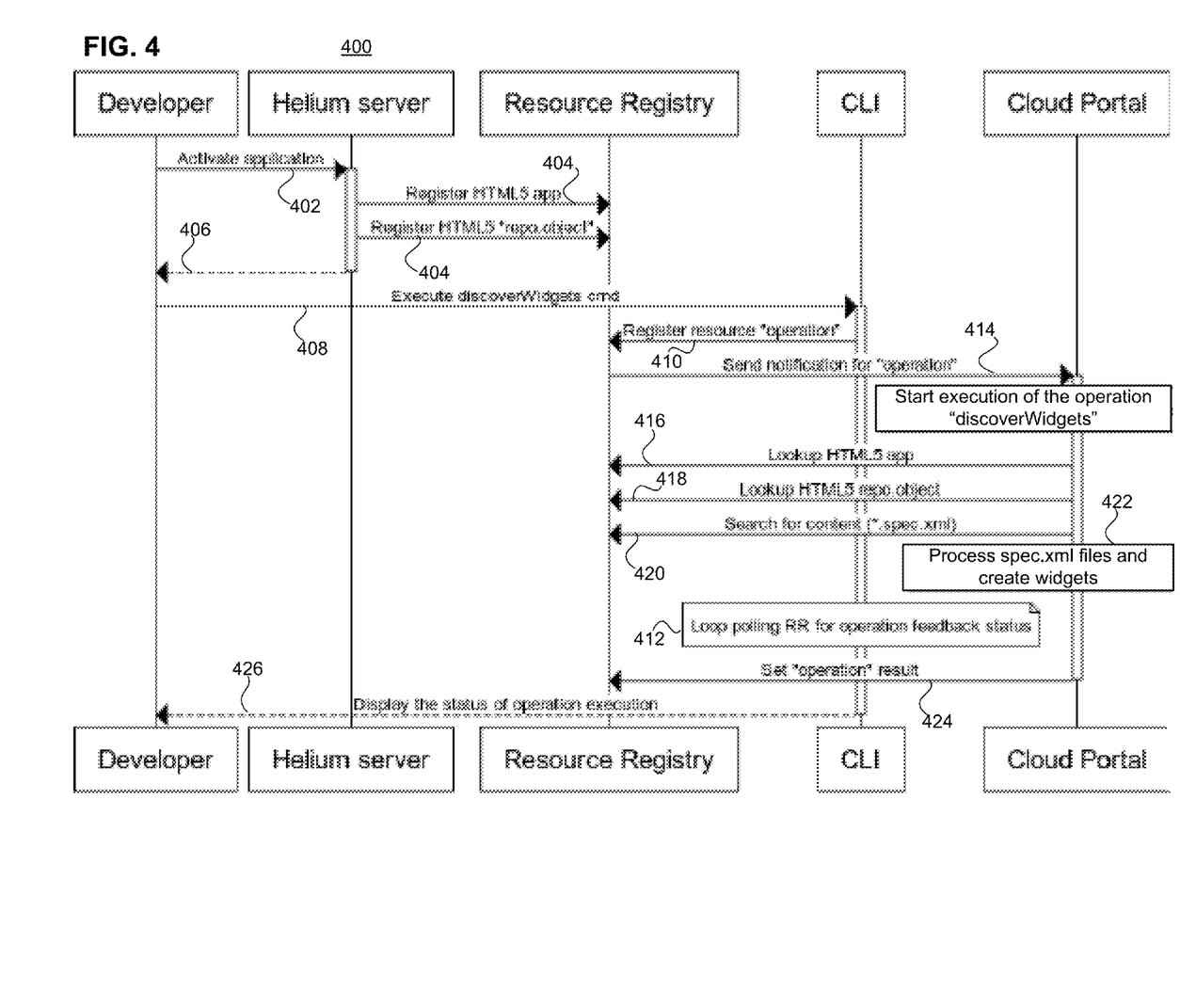
FIG. 4 is a simplified flow diagram showing an operation to discover widgets in an HTML5 application.

The instant example is now illustrated in connection with execution of a specific operation to discover widgets in an HTML5 application within the SAP cloud infrastructure. FIG. 4 illustrates the sequence of steps 400 that are to be performed when a developer seeks to manually trigger such an operation.

In a first step 402, the developer activates the HTML5 application.

In a second step 404, the server automatically registers the HTML5 application and HTML5 repo object resources in the resource registry. Confirmation of that registration is returned in step 406.

In a step 408, the developer executes the command "discoverWidgets". This command will take as parameters:
● account name, ● application name, ● apptype (html5).

In step 410, implementation of the command "discoverWidgets" will register the "operation" resource in the resource registry (operationName=discoverWidgets).

In step 412, implementation of the command "discoverWidgets" will start polling the feedback information for the "operation" resource in the resource registry.

In step 414, the resource registry sends notification to the cloud portal. The cloud portal is registered as resource listener for resources of type "operation", with metadata "operationName=discoverWidgets".

In step 416, the cloud portal looks up the HTML5 application relevant to the operation. That HTML5 application has the same: ● account name, ● application name, and ● apptype:
  GET https://deployment.<landscape host>/resourceRegistry/api/v1/restypes/application.html5?filter=(%26
  (account=test)(application=someapp)
  (apptype=html5))
From the received JSON describing the HTML5 application resource, the cloud portal takes the "url" metadata which is necessary for calculating the URL of the widgets.

In step 418, the cloud portal looks up the repo.object resource relevant to the operation. That repo.object has the same ● account name, ● application name, and ● apptype:
  GET https://deployment.<landscape host>/resourceRegistry/api/v1/restypes/repo.object?filter=(%26
  (account=test)(application=someapp)
  (apptype=html5))
From the JSON response, the repo.object ID is extracted.

In step 420, a cloud portal searches for extension resources ending with ".spec.xml" by using the discovered repo.object:
  https://deployment.<landscapehost>/resourceRegistry/
  api/v1/resaccessor/repo.object/9ef7b3d6-cbb5-4430-
  b341-344ee943ea20?query=.spec.xml.
The cloud portal receives a zip stream containing the files that correspond to the search criteria (i.e., ending with ".spec.xml").

In step 422, the cloud portal parses the xml files and creates widgets based on their content.

In step 424, the cloud portal returns feedback for the operation execution.

In step 426, the implementation of the command "discoverWidgets" receives the feedback information (e.g., status) for the result of the execution of the "operation".

Returning to FIG. 1, that drawing shows the resource registry as being separate from a repository containing binary files associated with execution of the operation. However this is not required, and in certain embodiments the resource registry could be implemented as part of a repository. For example, the resource registry could be implemented as part of an in-memory database engine, thereby leveraging the processing power of that engine.

It is further noted that the operation resource data/metadata may be stored in an in-memory database. The resource registry could thus be implemented as part of the in-memory database engine of that database, in order to leverage the processing power of that engine.

Figure 5:
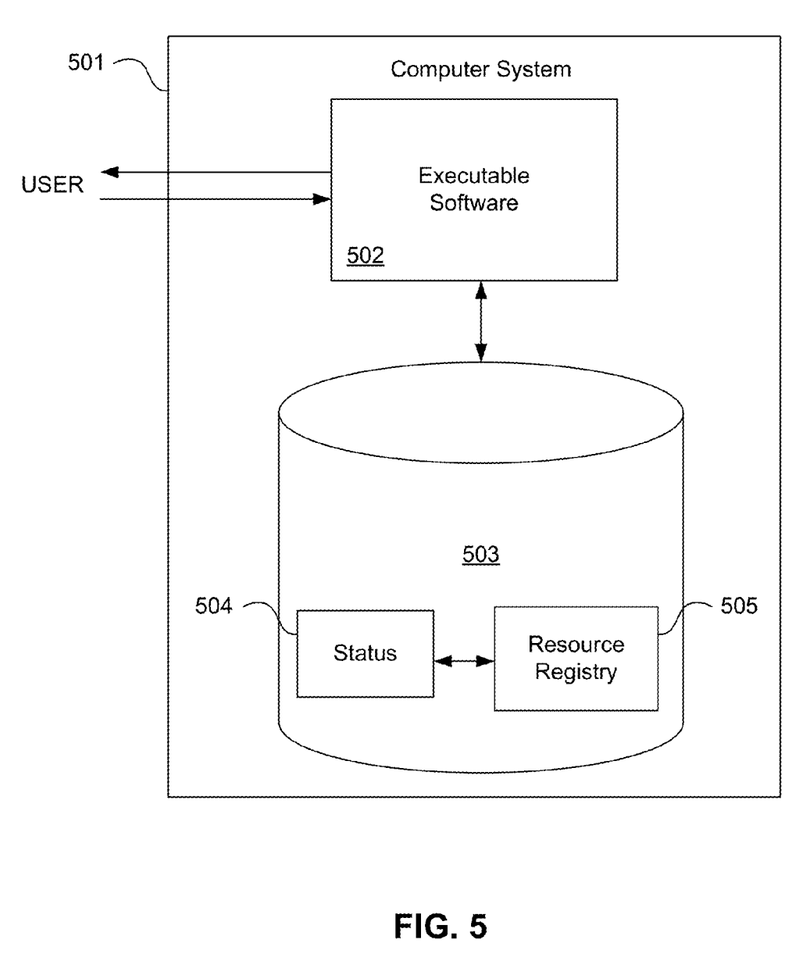
FIG. 5 illustrates hardware of a special purpose computing machine configured to provide a nondeterministic operation execution environment according to an embodiment.

FIG. 5 illustrates hardware of a special purpose computing machine configured to provide a nondeterministic operation execution environment according to an embodiment. In particular, computer system 501 comprises a processor 502 that is in electronic communication with a non-transitory computer-readable storage medium 503. This computer-readable storage medium has stored thereon code 505 corresponding to a resource registry. Code 504 corresponds to status information (e.g., as stored in metadata). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the resource registry is shown as part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the resource registry may be implemented in other ways, for example separate from a repository.

Figure 6:
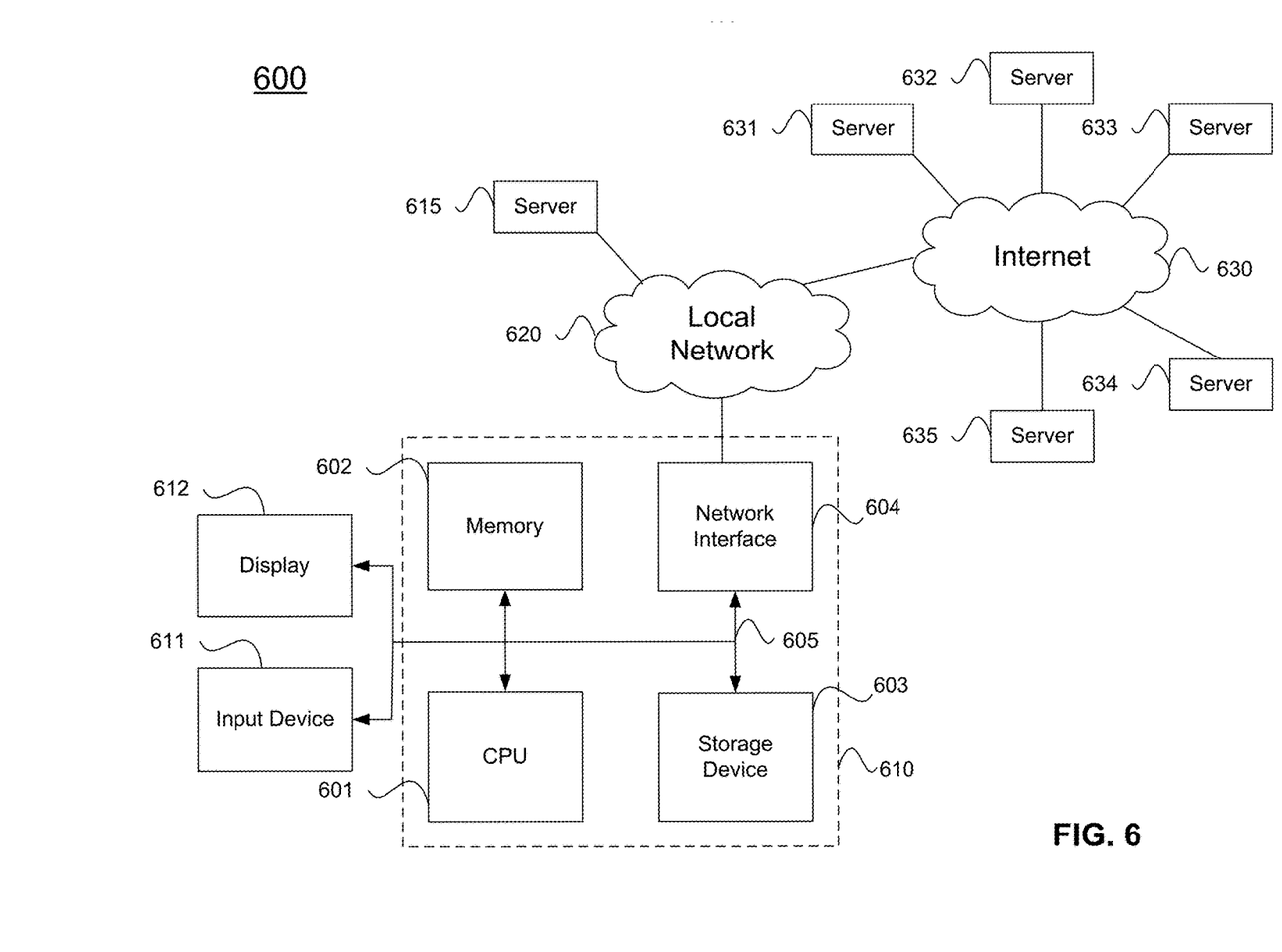
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
registering in a resource registry comprising an in-memory database engine, a first operation resource comprising first data and first metadata stored in an in-memory database;
an Application Program Interface (API) of the resource registry receiving from an operation requestor, a data aggregation operation including a parameter;
in response to the operation, the resource registry referencing the first data and the first metadata to cause the API to forward the data aggregation operation to an operation executor;
the API receiving from the operation executor, a current status of the data aggregation operation;
the resource registry updating the metadata to reflect the current status;
the resource registry feeding back the current status to the operation requestor based upon the first operation resource, wherein the first metadata further identifies a binary file associated with the data aggregation operation and identifies a location of a JAVA Platform as a Service (JPaaS) repository containing the binary file;
after feeding back the current status, the resource registry referencing a configuration file containing a list of operations;
based upon the configuration file, the resource registry not permanently storing the first operation resource based upon an appearance of the data aggregation operation in the list;
registering in the resource registry, a second operation resource comprising second data and second metadata stored in the in-memory database for the binary file; and
further in response to the operation, the resource registry referencing the second data and the second metadata to allow a resource accessor component of the resource registry in communication with the JPaaS repository, to access the binary file.

2. A method as in claim 1 wherein the current status of the data aggregation operation is fed back in response to polling the resource registry by the operation requestor.

3. A method as in claim 1 wherein the current status includes a JavaScript Object Notation (JSON) body.

4. A non-transitory computer readable storage medium embodying a computer program for performing a method, said method comprising:
providing a resource registry comprising an in-memory database engine and comprising an Application Program Interface (API) and a first operation resource comprising first data and first metadata stored in an in-memory database;
the API receiving from an operation requestor, a data aggregation operation including a parameter;
in response to the operation, the resource registry referencing the first data and the first metadata to cause the API to forward the data aggregation operation to an operation executor;
the API receiving from the operation executor, a current status of the data aggregation operation;
the resource registry including the current status in the metadata;
in response to polling by the operation requestor, the resource registry feeding back the current status to the operation requestor based upon the first operation resource, wherein the first metadata further identifies a binary file associated with the operation and identifies a location of a JAVA Platform as a Service (JPaaS) repository containing the binary file;
after feeding back the current status, the resource registry referencing a configuration file containing a list of operations;
based upon the configuration file, the resource registry not permanently storing the first operation resource based upon an appearance of the data aggregation operation in the list;
registering in the resource registry, a second operation resource comprising second data and second metadata stored in the in-memory database for the binary file; and
further in response to the operation, the resource registry referencing the second data and the second metadata to allow a resource accessor component of the resource registry in communication with the JPaaS repository, to access the binary file.

5. A non-transitory computer readable storage medium as in claim 4 wherein the current status includes a JavaScript Object Notation (JSON) body.

6. A non-transitory computer readable storage medium as in claim 4 wherein the metadata identifies a location of a repository containing the binary file.

7. A non-transitory computer readable storage medium as in claim 4 wherein the resource registry comprises an in-memory database engine.

8. A computer system comprising:
one or more processors;
a software program, executable on said computer system, the software program configured to cause a resource registry comprising an in-memory database engine to:
receive from an operation requestor, a data aggregation operation including a parameter;
in response to the data aggregation operation, reference first data and first metadata stored in an in-memory database of a first operation resource of the resource registry to cause an API of the resource registry to forward the data aggregation operation to an operation executor;
receive from the operation executor, a current status of the data aggregation operation;
include the current status in the first metadata; and
in response to polling by the operation requestor, feed the current status back to the operation requestor based upon the first operation resource,
after feeding back the current status, the resource registry referencing a configuration file containing a list of operations;
based upon the configuration file, the resource registry not permanently storing the first operation resource based upon an appearance of the data aggregation operation in the list;
wherein the resource registry further comprises a resource accessor component in communication with a JAVA Platform as a Service (JPaaS) repository storing a binary file for execution in conjunction with the operation, and
wherein the first metadata further includes information regarding the binary file and identifying a location of the JPaaS repository,
register in the resource registry, a second operation resource comprising second data and second metadata stored in the in-memory database for the binary file; and
further in response to the operation, the reference the second data and the second metadata to allow the resource accessor component to access the binary file.

9. A computer system as in claim 8 wherein the current status includes a JavaScript Object Notation (JSON) body.

* * * * *